United States Patent
Kokkula et al.

(10) Patent No.: US 10,484,250 B2
(45) Date of Patent: *Nov. 19, 2019

(54) SYSTEMS AND METHODS FOR DETERMINING NETWORK CONFIGURATIONS USING HISTORICAL AND REAL-TIME NETWORK METRICS

(71) Applicant: CITRIX SYSTEMS, INC., Fort Lauderdale, FL (US)

(72) Inventors: Samrat Kokkula, Bangalore (IN); Ioannis Nikiforakis, Rio Patras (GR); Georgios Oikonomou, Rio Patras (GR)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,422

(22) Filed: Sep. 11, 2018

(65) Prior Publication Data

US 2019/0028357 A1    Jan. 24, 2019

Related U.S. Application Data

(63) Continuation of application No. 15/295,738, filed on Oct. 17, 2016, now Pat. No. 10,116,521.

(60) Provisional application No. 62/242,051, filed on Oct. 15, 2015.

(51) Int. Cl.
*H04L 12/24* (2006.01)
*H04L 12/26* (2006.01)

(52) U.S. Cl.
CPC ........ *H04L 41/145* (2013.01); *H04L 41/0813* (2013.01); *H04L 41/0823* (2013.01); *H04L 41/147* (2013.01); *H04L 43/08* (2013.01); *H04L 43/0876* (2013.01)

(58) Field of Classification Search
CPC ............... H04L 41/145; H04L 41/0823; H04L 43/0876; H04L 43/08
See application file for complete search history.

(56) References Cited

U.S. PATENT DOCUMENTS

| 7,656,810 | B2 | 2/2010 | Horton et al. |
| 9,369,785 | B1 | 6/2016 | Schmidtke et al. |
| 10,116,521 | B2* | 10/2018 | Kokkula ............... H04L 41/145 |
| 2011/0137973 | A1 | 6/2011 | Wei et al. |
| 2013/0089038 | A1 | 4/2013 | Hannu et al. |
| 2015/0333992 | A1 | 11/2015 | Vasseur et al. |

* cited by examiner

*Primary Examiner* — Mohammad S Anwar
(74) *Attorney, Agent, or Firm* — Allen, Dyer, Doppelt & Gilchrist, PA (57) ABSTRACT

A method for optimizing network performance includes receiving data related to one or more network metrics, and determining whether the received data is to be used for creating a new model or updating an existing model that represents a recurring pattern in the received data to be used to predict or detect one or more network events. If the received data is not to be used for creating the new model or updating the existing model, then apply the data to the existing model. The method further includes determining a configuration related to one or more network devices based on the received data being applied to the determined model, and configuring the one or more network devices according to the determined configuration.

20 Claims, 7 Drawing Sheets

SYSTEMS AND METHODS FOR DETERMINING NETWORK CONFIGURATIONS USING HISTORICAL AND REAL-TIME NETWORK METRICS

RELATED APPLICATIONS

The present application is a continuation of U.S. patent application Ser. No. 15/295,738 filed Oct. 17, 2016, which claims priority to U.S. Provisional Patent Application No. 62/242,051, which was filed on Oct. 15, 2015, each of which is incorporated by reference herein in its entirety.

BACKGROUND

In modern network environments, various network events affect the network performance (e.g., throughput). For example, the volume and types of network traffic can change with time. The change in network traffic volume and types can be due to various reasons, including but not limited to changes in network resource usage by network users, malicious attacks conducted by hackers, etc. Due to the potential for network instability, there is a need for improved systems and methods for the network devices to be able to detect or predict such events, and to perform a real-time action (either as a real-time or an anticipatory response to those events), to optimize network traffic and to maintain or improve network performance in real-time.

SUMMARY

A method for optimizing network performance includes receiving data related to one or more network metrics, and determining whether the received data is to be used for creating a new model or updating an existing model that represents a recurring pattern in the received data to be used to predict or detect one or more network events. If the received data is not to be used for creating the new model or updating the existing model, then apply the data to the existing model. The method further includes determining a configuration related to one or more network devices based on the received data being applied to the determined model, and configuring the one or more network devices according to the determined configuration.

If the received data is to be used for creating the new model or updating the existing model, then the model is created or updated, with the created or updated model to be used with subsequently received data. The received data corresponds with a use case, with each use case including different strategies and purposes for optimizing network performance.

The received data is used to determine a use case that comprises detecting network traffic associated with a predetermined protocol and with a predetermined physical layer based on at least one of protocol properties, traffic patterns, and packet-rate specific metrics.

The model comprises a clustering model of network traffic patterns associated with the network traffic, the clustering model being generated based on at least one of sources of the network traffic, applications associated with the network traffic, time periods associated with the network traffic, types of contents associated with the network traffic, and types of users associated with the network traffic.

The received data is used to determine a use case that comprises supporting dynamically allocating network resources, wherein the configuration is determined based on the current network traffic and predicted demand indicated by the model.

The received data is used to determine a use case that comprises adapting a traffic profile for network traffic, wherein the configuration is determined based on a predicted network load indicated by the model and comprises at least one of a maximum segment size (MSS) for data packets, a value of maximum burst size of the network traffic, and a buffer size of a queue for the data packets.

The received data is used to determine a use case that comprises determining at least one of a caching or a compression policy for webpage data, wherein the configuration is determined based on at least one of current network load, predicted network load indicated by the model, and predicted pattern of access to a website indicated by the model.

The received data is used to determine a use case that comprises detecting a malicious attack over a network, wherein the configuration is determined based on comparing a current pattern of network traffic against a historic pattern of the network traffic indicated by the model and comprises rerouting data packets away from a target device.

Another aspect is directed to an apparatus for optimizing network performance, comprising a memory that stores a set of instructions, and a hardware processor configured to execute the set of instructions. The instructions are executed to receive data related to one or more network metrics, and determine whether the received data is to be used for creating a new model or updating an existing model that represents a recurring pattern in the received data to be used to predict or detect one or more network events. If the received data is not to be used for creating the new model or updating the existing model, then the data is applied to the existing model. The instructions are further executed to determine a configuration related to the one or more network devices based on the received data being applied to the determined model, and configure the one or more network devices according to the determined configuration.

Yet another aspect is directed to a non-transitory computer readable medium that stores a set of instructions that is executable by at least one processor of an apparatus to cause the apparatus to perform a method for optimizing network performance as described above.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

Figure 1A:
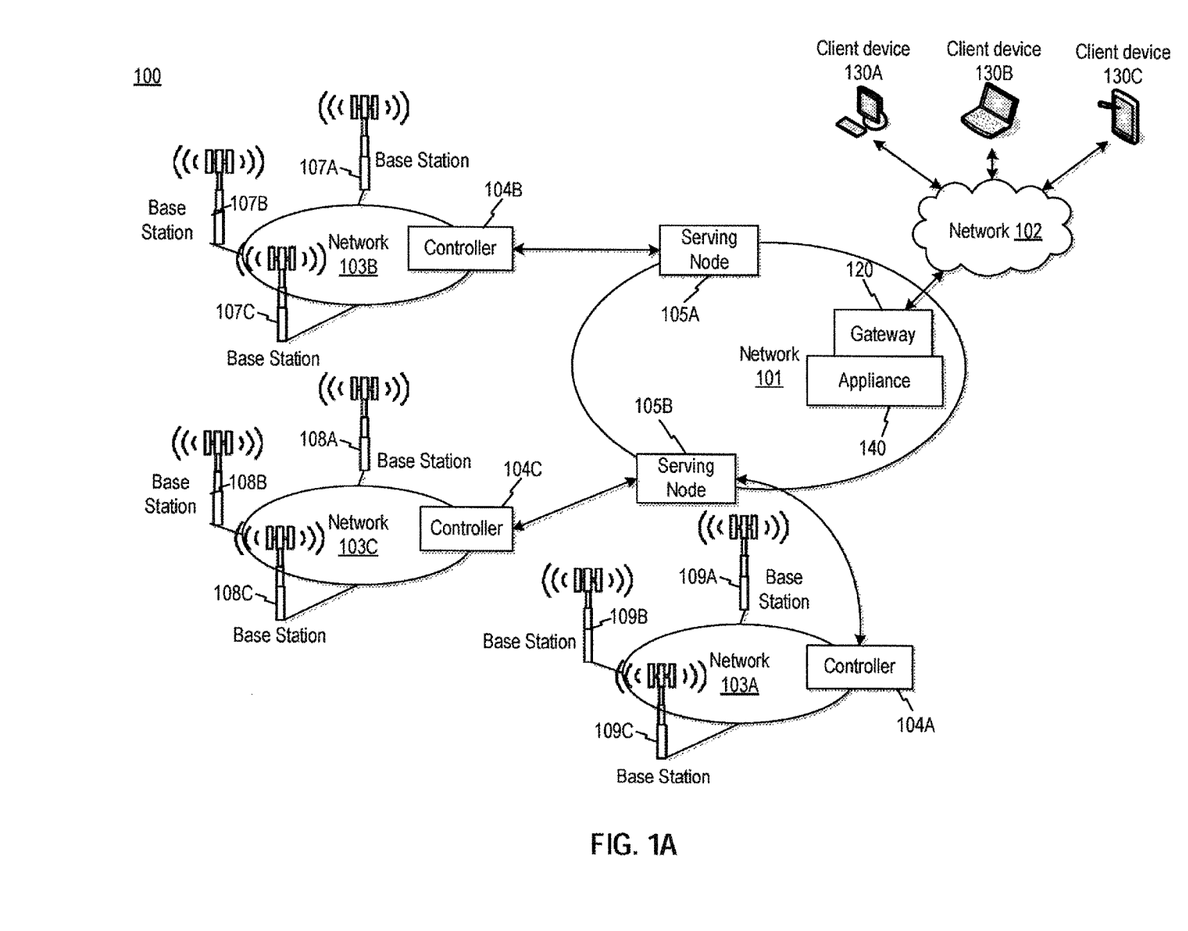
FIGS. 1A-1B are block diagrams of exemplary network environment, consistent with embodiments of the present disclosure.

The embodiments described herein provide for determination of a real-time action as a real-time or anticipatory response to respectively one or more detected or predicted network events. Disclosed systems and methods optimize network traffic and maintain or improve network performance in real-time, using historical network metrics to detect and predict events that can affect network performance The systems and methods can prepare real-time and/or anticipatory responses to the predicted events, to maintain or improve network performance FIG. 1A is a block diagram of an exemplary communication system 100. Exemplary communication system 100 can be any type of system that transmits data packets over a network. For example, the exemplary communication system 100 can include one or more networks transmitting data packets across wired or wireless networks to terminals (terminals not shown in FIG. 1A). The exemplary communication system 100 can have network architectures of, for example, a GSM network, a UMTS network that adopts Wideband Code Division Multiple Access (W-CDMA) radio access technology, a CDMA2000 network, and a WiMax network.

The exemplary communication system 100 can include, among other things, one or more networks 101, 102, 103 (A-C), one or more controllers 104(A-D), one or more serving nodes 105(A-B), one or more base stations 107(A-C)-109(A-C), a gateway 120, and one or more appliances 140. At a high level, communication system 100 can have a tree-like network topology with gateway 120 being the tree's root node and base stations 107-109 being the leaves.

Network 101 can be any combination of radio networks, wide area networks (WANs), local area networks (LANs), or wireless networks suitable for packet-type communications, such as Internet communications. For example, in one exemplary embodiment, network 101 can be a General Packet Radio Service (GPRS) core network, which provides mobility management, session management and transport for Internet Protocol packet services in GSM and W-CDMA networks. In some embodiments, network 101 can include a gateway 120 and one or more serving nodes 105(A-B).

Network 102 can include any combinations of wide area networks (WANs), local area networks (LANs), or wireless networks suitable for packet-type communications. In some exemplary embodiments, network 102 can be, for example, Internet and X.25 networks. In some embodiments, network 102 can receive data packets from client devices 130(A-C). Client devices 130 can be any device that is configured to communicate with another remote device (e.g., a server, another client device, etc.) through networks 101 and 103. Network 102 can communicate data packet received from client devices 130 with network 101 via, for example gateway 120. While client devices 130 are portrayed as a computer (e.g., client device 130A), a laptop (e.g., client device 130B), and a tablet (e.g., client device 130C), it is appreciated that client devices 130 could be any type of device (e.g., such as a wearable smart watch) that communicates packets through networks 101, 102, and 103.

Gateway 120 is a device that converts formatted data provided in one type of network to a particular format required for another type of network. Gateway 120 may be a server, a router, a firewall server, a host, or a proxy server or any combination of those. In some embodiments, gateway 120 can include load balancers or other similar systems. In some embodiments, gateway 120 can transform signals received from router 110 into a signal that network 101 can understand, and vice versa. Gateway 120 may be capable of processing webpage, image, audio, video, and T.120 transmissions alone or in any combination, and is capable of full duplex media translations. As an exemplary embodiment, gateway 120 can be a Gateway GPRS Support Node (GGSN) that supports interworking between the GPRS network and external packet switched networks, like the Internet and X.25 networks.

Serving nodes 105 are devices that deliver data packets from gateway 120 to a corresponding network 103 within its geographical service area and vice versa. A serving node 105 can be, for example, a server, a router, a firewall server, a host, or a proxy server. A serving node 105 can also have functions including packet routing and transfer, mobility management (attach/detach and location management), logical link management, network accessing mediation and authentication, and charging functions. In some embodiments, a serving node 105 can be a Serving GPRS Support Node (SGSN). In such embodiments, SGSN can have location register, which stores location information, e.g., current cell, current visitor location (VLR) and user profiles, e.g., International Mobile Subscriber Identity (IMSI), and addresses used in the packet data network, of all GPRS users registered with this SGSN.

Network 103 can include any network suitable for packet-type communications. Network 103 can be part of, for example, a large-scale cellular network such as Universal Mobile Telecommunications System (UMTS), Global System for Mobile Communications (GSM), Long-Term Evolution (LTE), fifth-generation (5G) network, etc. In some exemplary embodiments, depending on the underlying transport technology being utilized, the Radio Access Network (RAN) or Backhaul area of network 103 can have a ring topology. In some embodiments, network 103 can be a RAN in a GSM system or a Backhaul area of a UMTS system. The exemplary network 103 can include, among other things, base stations 107-109 (e.g., base transceiver stations (BTSs) or Node-Bs), and one or more controllers 104(A-C) (e.g., base-station controllers (BSCs) or radio network controllers (RNCs)). Mobile terminals (not shown in FIG. 1) communicate with BTS/Node-B 107-109 which have radio transceiver equipment. BTS/Node-B 107-109 communicate with BSC/RNC 104(A-C), which are responsible for allocation of radio channels and handoffs as users move from one cell to another. The BSC/RNC 104(A-C) in turn communicate to serving nodes 105, which manage mobility of users as well as provide other functions such as mediating access to the network and charging.

In some embodiments, network 103 may also be part of, for example, a short-range wireless network, such as Bluetooth™, Zigbee™, etc. Network 103 can also be part of a sensor network that collects and transmits data related to one or more physical quantities (e.g., light, sound, pressure, etc.). In some embodiments, network 103 can include a heterogeneous network that includes at least one of the aforementioned large-scale cellular network, short-range wireless network, and sensor network, and can be configured for an Internet-of-Thing (IoT) application for collecting data related to one or more physical quantities and transmitting the data to a remote device (e.g., client devices 130A-C, serving node 105A, etc.) for processing. As an illustrative example, network 103 can be part of a home sensor network that collects light and sound data within a home, and transmits the light and sound data through a short-range wireless network (e.g., Zigbee™), and a large-scale cellular network (e.g., LTE), to a server for security threat detection.

Appliance 140 is a device that can optimize and control, for example, wide area network (WAN) traffic. In some embodiments, appliance 140 optimizes other types of network traffic, such as local area network (LAN) traffic, metropolitan area network (MAN) traffic, or other wireless network traffic (e.g., traffic generated from the aforementioned home sensor network for IoT applications). Appliance 140 can also handle different network like Multiprotocol Label Switching ("MPLS") common in many corporate networks. Appliance 140 can optimize network traffic by, for example, scheduling data packets in an established communication link so that the data packets can be transmitted or dropped at a scheduled time and rate. In some embodiments, appliance 140 is a physical device, such as Citrix System's Branch Repeater, NetScaler, or NetScaler SD-WAN. In some embodiments, appliance 140 can be a virtual appliance. In some embodiments, appliance 140 can be a containerized appliance (e.g. NetScaler CPX) and can operate on containerization platforms such as Docker™, or any other container-like architectures. In some embodiments, appliance 140 can also be a physical device having multiple instances of virtual machines (e.g., NetScaler VPX). As shown in FIG. 1A, appliance 140 can be deployed at various locations within network 101. In some embodiments, appliance 140 can be located at gateway 120, at controller 104, at one or more base stations 107-109, or any other locations, to optimize the network traffic at that location. In some embodiments, appliance 140 can control the loading of various network elements connected to network 101, such as serving nodes 105 and gateway 120.

Figure 1B:
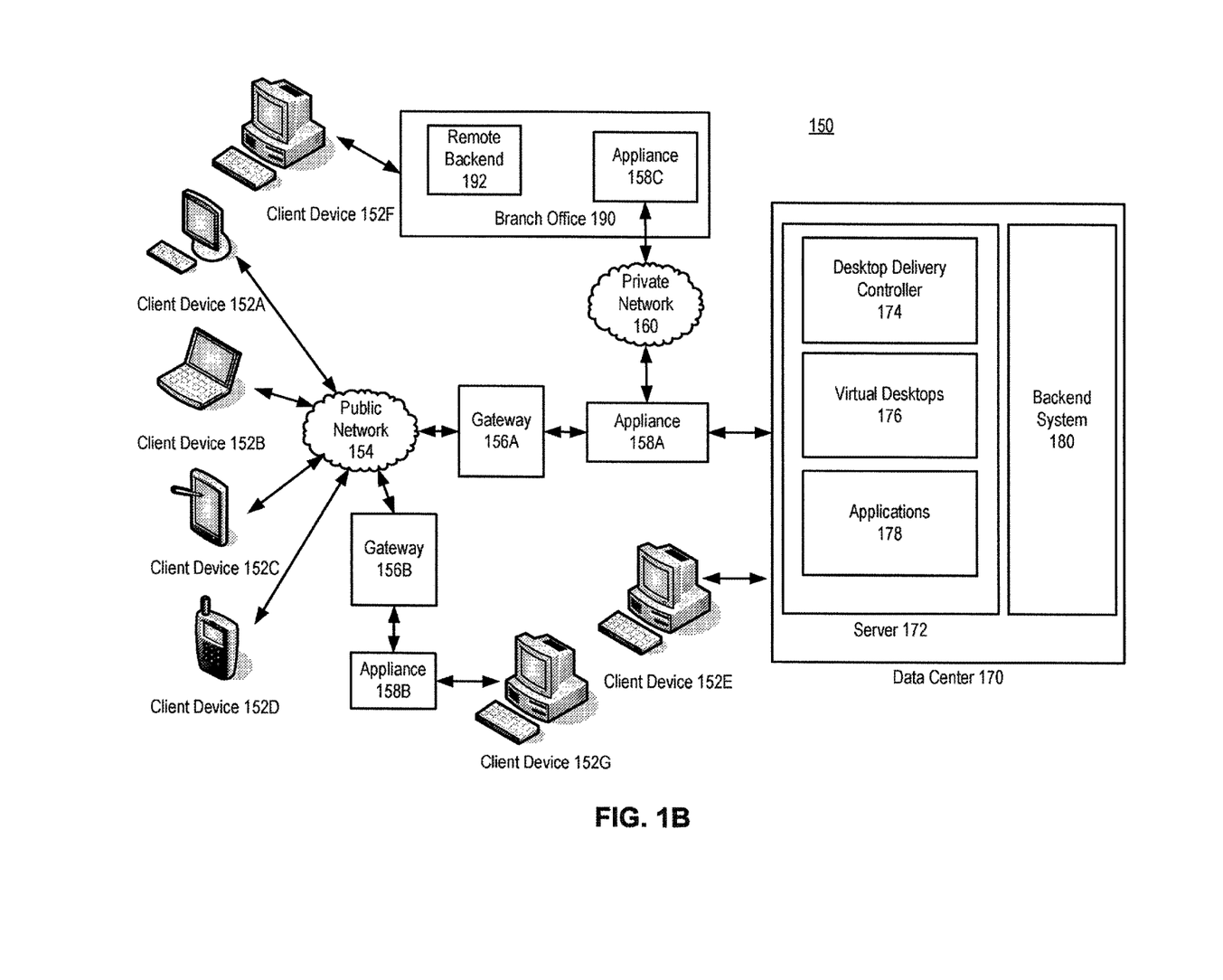

FIG. 1B is a block diagram of an exemplary network environment 150. While exemplary network environment 150 is directed to a virtual network environment, it is appreciated that the network environment can be any type of network that communicates using packets. Network environment 150 can include one or more client devices 152(A-G), a public network 154, one or more gateways 156(A-B), one or more appliances 158(A-C), a private network 160, a data center 170, and a branch office 190.

One or more client devices 152 can acquire remote services from data center 170 through various means. Client devices 152 can communicate with data center 170 either directly (e.g., client device 152E) or indirectly through a public network 154 (e.g., client devices 152A-D) or a private network 160 (e.g., client device 152F). When client device 152 communicates through public network 154 or private network 160, a communication link can be established. For example, a link can be established by public network 154, gateway 156A, and appliance 158A, thereby providing a client device (e.g., client devices 152A-D) access to data center 170. A link can also be established by branch office 190 including appliance 158C, private network 160, and appliance 158A, thereby providing a client device (e.g., client device 152F) access to data center 170. Additional links can also be established by appliance 158B, gateway 156B, public network 104, gateway 156A and appliance 158A providing client device 152G with access to data center 170 through a public network 154. While client devices 152 are portrayed as a computer (e.g., client devices 152A, 152E, 152F, and 152G), a laptop (e.g., client device 152B), a tablet (e.g., client device 152C), and a mobile smart phone (e.g., client device 152D), it is appreciated that client device 152 could be any type of device (e.g., such as a wearable smart watch or a remote sensor able to communicate through any wireless or wired protocol) that communicates packets to and from data center 170.

Public network 154 and private network 150 can be any type of network such as a wide area network (WAN), a local area network (LAN), or a metropolitan area network (MAN). As an example, a WAN can be the Internet or the World Wide Web, and a LAN can be a corporate Intranet. Public network 154 and private network 160 can be a wired network or a wireless network.

Gateways 156A-B are physical devices or are software that is part of a physical device that interfaces between two networks having different protocols. Gateways 156A-B, for example, can be a server, a router, a host, or a proxy server. In some embodiments, gateways 156A-B can include or be coupled to a firewall separating gateways 156A-B from public network 154 (e.g., Internet). Gateways 156A-B have the ability to modify signals received from client device 152 into signals that appliances 158A-C and/or data center 170 can understand and vice versa.

In some embodiments, appliances 158 are devices that can optimize and control network traffic, similar to appliance 140 of FIG. 1A. In some embodiments, appliance 158A is a physical device, such as Citrix System's Branch Repeater, NetScaler, or NetScaler SD-WAN. In some embodiments, appliance 158A can be a virtual appliance. In some embodiments, appliance 158A can be a physical device having multiple instances of virtual machines (e.g., virtual Cloud Bridge). In some embodiments, a first appliance (e.g., appliance 158A) works in conjunction with or cooperation with a second appliance (e.g., appliance 158B or appliance 158C) to optimize network traffic. For example, the first appliance can be located between the WAN and a corporate LAN (e.g., data center 170), while a second appliance (e.g., appliance 158C) can be located between a branch office (e.g., branch office 190) and a WAN connection. An additional appliance (e.g., appliance 158B) could also be connected through public network 154. In some embodiments, the functionality of gateway 156A and appliance 158A can be located in a single physical device. Appliances 158A, 158B, and 158C can have the same or similar functionality.

Data center 170 is a central repository, either physical or virtual, for the storage, management, and dissemination of data and information pertaining to a particular public or private entity. Data center 170 can house computer systems and associated components, such as one or physical servers, virtual servers, and storage systems. Data center 170 can include, among other things, one or more servers (e.g., server 172) and a backend system 180. In some embodiments data center 170 can include gateway 156A, appliance 158A, or a combination of both. In some embodiments, appliances 158 (e.g., Appliance 158A-C) can be deployed to optimize the network traffic between, for example, client devices 152A-G) and data center 170, and/or to control the capacity allocation of various hardware elements at data center 170.

Server 172 is an entity represented by an IP address and can exist as a single entity or a member of a server farm. Server 172 can be a physical server or a virtual server. In some embodiments, server 172 can include a hardware layer, an operating system, and a hypervisor creating or managing one or more virtual machines. Server 172 provides one or more services to an endpoint. These services include providing one or more applications 178 to one or more endpoints (e.g., client devices 152A-G or branch office 190). For example, applications 178 can include Windows™-based applications and computing resources. In some embodiments, appliances 158 (e.g., Appliance 158A-C) can be deployed to optimize the network traffic between, for example, client devices 152A-G) and data center 170 based on, for example, network traffic associated with applications 178 and/or associated with server 172.

Desktop delivery controller 174 is a device that enables delivery of services, such as virtual desktops 176, to client devices (e.g., client devices 152A-G or branch office 190). Desktop delivery controller 174 provides functionality required to manage, maintain, and optimize all virtual desktop communications.

In some embodiments, the services include providing one or more virtual desktops 176 that can provide one or more applications 178. Virtual desktops 176 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 180 includes computer networking hardware such as one or more appliances or servers in a server farm or a bank of servers and interfaces directly or indirectly with server 172. For example, backend system 180 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Backend system 180 can also include, among other things, an Oracle backend server, a SQL Server backend, and/or a dynamic host configuration protocol (DHCP). Backend system 180 can provide data, services, or a combination of both to data center 170, which can then provide that information via varying forms to client devices 152 or branch office 190.

Branch office 190 is part of a local area network (LAN) that is part of the WAN having data center 170. Branch office 190 can include, among other things, appliance 158C and remote backend 192. In some embodiments, appliance 158C is communicatively located between branch office 190 and private network 160. As stated above, appliance 158C can work with appliance 158A. Remote backend 192 can be set up in similar manner as backend system 180 of data center 170. Client device 152F can be located on-site to branch office 190 or can be located remotely from branch office 190.

Appliances 158A-C and gateways 156A-B can be deployed as or executed on any type and form of computing device, such as a computer or networking devices capable of communicating on any type and form of network described herein. As in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), a RAM, a PROM, EPROM, FLASH-EPROM or any other flash memory, a cache, a register, any other memory chip or cartridge, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

Figure 2A:
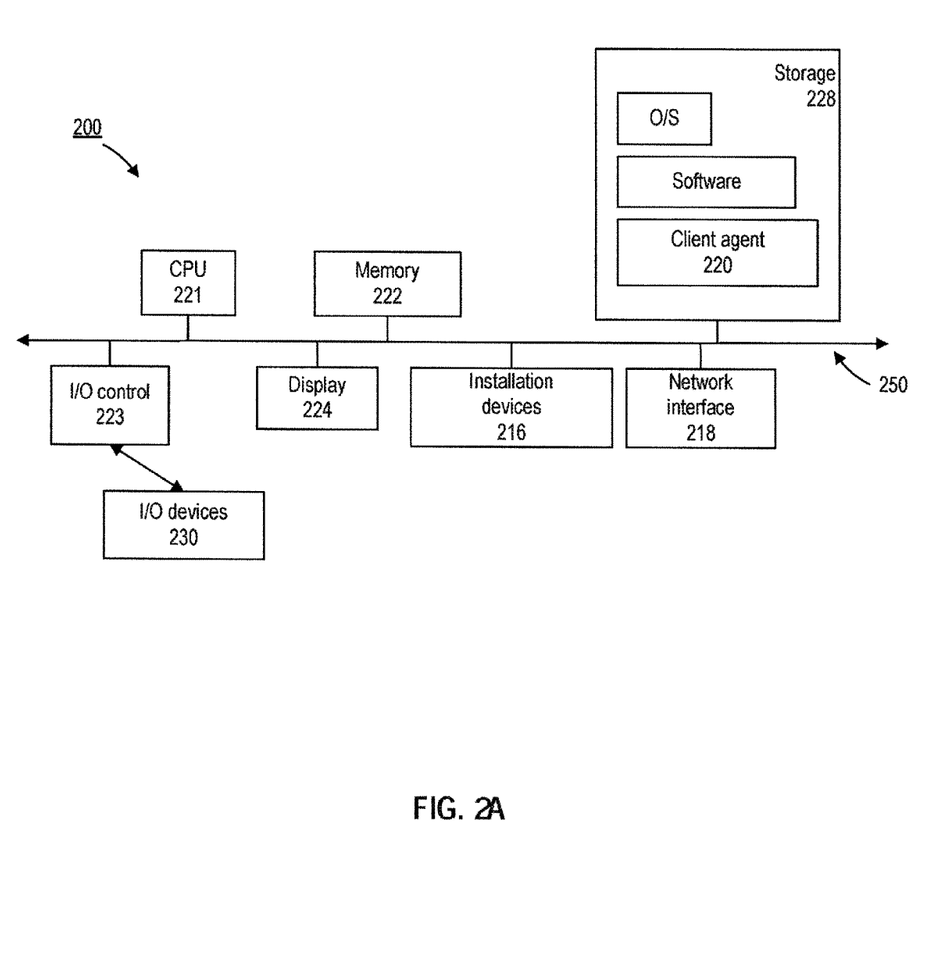
FIGS. 2A-2B are block diagrams of exemplary computing devices, consistent with embodiments of the present disclosure.
Figure 2B:
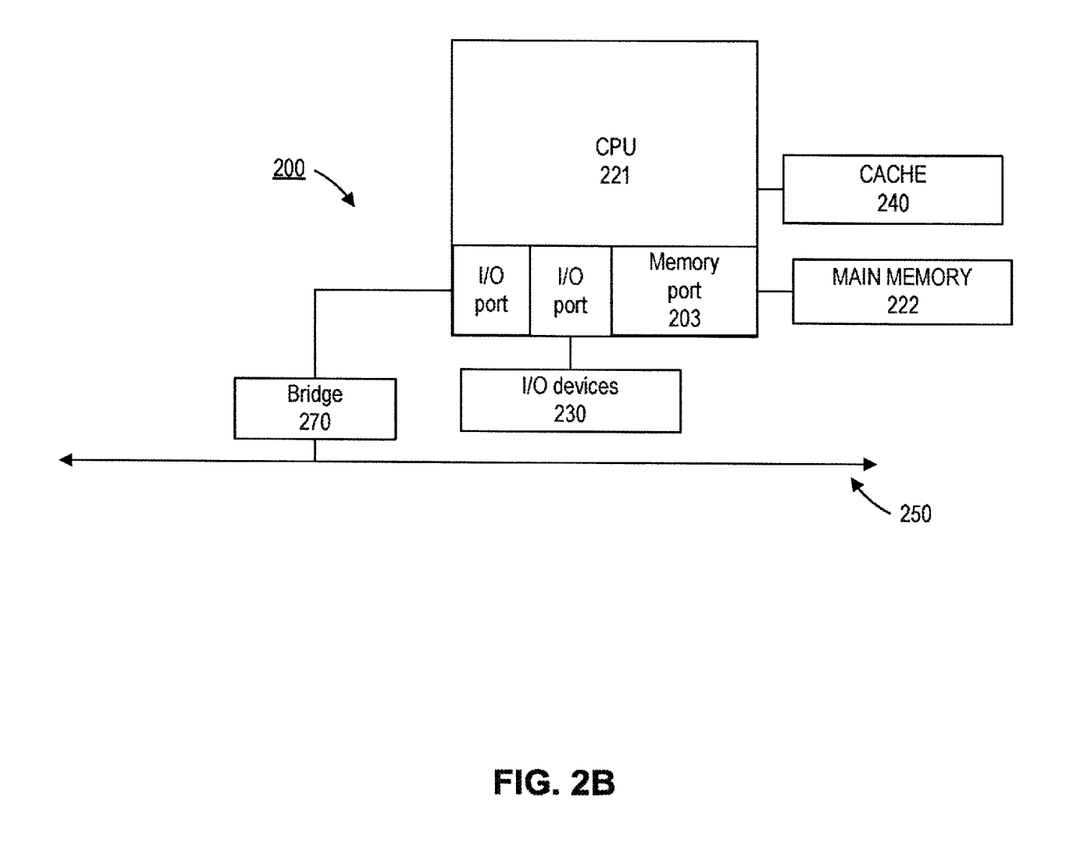

FIG. 2B depicts an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as: a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Networking can encompass many different technologies and protocols designed to connect two or more computing devices, systems, or environments. For example, the Internet Protocol ("IP") is a standard communications protocol commonly used to control and route Internet traffic. IP is widely used as a backbone protocol for the Internet. The most commonly used versions of IP are IP version 4 ("IPv4") and IP version 6 ("IPv6"), which are both well known and are described in IETF RFC 791 and IETF RFC 2460, respectively.

Network device configuration can be determined by, for example, appliances 140 and 158 of FIG. 1A-B to optimize network traffic. The optimization can be determined based on various use cases, which can include different strategies and purposes for the network traffic optimization. In some embodiments, a use case can be associated with a specific application and/or a specific Internet protocol. Based on a use case, specific network metrics data can be collected. The network metrics data can be analyzed, and can be used for prediction and/or detection of one or more network events according to the use case. These network events can include, for example, changes in a network load, changes in demand for network resources, a malicious attack being underway, etc. A response (e.g., in the form of configuration of network devices) can then be determined to optimize network traffic according to the use case, based on the prediction and/or detection of one or more network events.

In some embodiments, a use case can include the detection of a network traffic pattern for a specific kind of Internet protocol, which can be used to determine (or infer) the content types of the data packets (e.g., whether media content is included). Based on the determined content type, and the associated network traffic pattern, a set of configurations can be determined (for example, by the appliance) to optimize the network traffic. As an illustrative example, in a case where a network traffic pattern that uses encryption or carried over an encrypted channel (e.g., HTTPS) is detected, it can be determined that the network traffic is associated with transmission of video content, and that it requires a set of configuration of network devices (e.g., applying a traffic policy that is associated with the underlying network protocol, configuration of the gateway and/or router to select a different content server for load balancing, etc.), in real-time with respect to the traffic, to achieve a certain level of performance (e.g., to set the percentage of dropped frames at a certain level). In some embodiments, the determination of the Internet protocol can also be made based on, for example, protocol properties (e.g., headers, IP addresses, transport layer ports, etc.), distinct traffic patterns (e.g., certain sequences of packet transmissions that can be used as a signature of an IP protocol), or specific packet-rate specific metrics (e.g. packet inter-arrival times) that can imply the use of a specific type of network and/or the underlying network physical layer. As an illustrative example, traffic associated with Wi-Fi typically come in bursts, while traffic associated with cellular network typically are more uniform.

In some embodiments, a use case can include a strategy of prediction of future load and balancing of current load at various network devices, including the appliance. A set of configurations of network devices can then be determined to adapt to the predicted future load and/or current load, to optimize network traffic. As an illustrative example, appliance 140 of FIG. 1A can employ a specific load balancing algorithm (e.g., round-robin, etc.) to balance loads between serving node 105A and serving node 105B. But, based on the current relative loading of the serving nodes (e.g., serving node 105A having a much higher loading than 105B), appliance 140 can modify the load balancing algorithm (or adopt a different algorithm) to route more network traffic to serving node 105B instead. As another illustrative example, as discussed before, a pattern of network traffic can be determined. Based on the pattern, appliance 140 can predict the recurrence of a similar network traffic volume at serving nodes 105A and 105B at a certain time and/or day, and pre-set the load balancing algorithm for that particular time and/or day based on the prediction.

In some embodiments, a use case can include a strategy of capacity planning at a network device (e.g., to manage capacity allocation of one or more hardware resources at a data center). As an illustrative example, data center 170 of FIG. 1B can be part of a cloud-infrastructure configured to provide a service such as a cloud computing service. The service can be associated with a specific application being executed by data center 170 (e.g., applications 178). Based on data that reflects either the current or predicted demand of the specific service (e.g., as reflected by the access requests of applications 178), an appliance (e.g., appliance 158A of FIG. 1B) can configure data center 170 to reserve certain hardware resources (e.g., processor and memory resources, network interface resources, etc.) for the execution of applications 178. In some embodiments, the data can be collected by an application delivery controller (e.g., NetScaler, desktop delivery controller 174 of FIG. 1B, etc.), which can also determine which application (or service) the data is associated with. The data can then be used to determine a current or predicted demand of the service.

In some embodiments, a use case can include a strategy of determining, in real-time, a set of configurations of network devices to support dynamic licensing, dynamic profiling, and/or dynamic compression and/or caching decision. As an illustrative example, multiple license types may exist for a specific service offering to a particular user. A type of license may define various metrics including, for example, a number of connections the appliance can handle, a volume of network traffic the appliance can process, etc. The volume of network traffic (and/or the number of connections) associated with a specific type of license can be bounded by the associated metrics. In some embodiments, the licenses can be allocated dynamically based on, for example, the current network load, and/or the predicted demand For example, the appliance (or other network device) may require a license that supports higher volume for a network traffic (e.g., media data transmission) originated by a user, when the appliance predicts a higher network load (e.g., a network traffic volume that exceeds a certain threshold). On the other hand, when the system detects that the current network load is lighter (e.g., a network traffic volume that drops below the threshold), the appliance may dynamically change the license requirement, and only require a license that supports lesser volume for the network traffic originated by that user.

As another illustrative example, multiple traffic profiles may exist for different types of network traffic and/or originated from different users. In some embodiments, a traffic profile can include a set of configurations to be applied to one or more network devices to control various attributes of the network traffic. Settings for such configurations can include, for example, a value of maximum segment size (MSS) for the data packet transmitted through the network, a value of maximum burst size of the network traffic, a buffer size of a queue (e.g., at a router or a server) where the data packets are queued, etc. Such a traffic profile can be associated with various parameters, such as a particular type of network traffic (e.g., media data transmission), a particular type of application (e.g., VoIP application), and/or a specific user (e.g., whether the user subscribes to a certain level of network service), etc. In some embodiments, the association between the traffic profile and the aforementioned parameters can be updated dynamically based on, for example, the current network load. For example, if there is a spike in the network load, the traffic profile can be dynamically updated (or a different traffic profile can be selected), in real-time, for a particular type of network traffic, application, and/or a specific user to adapt to the spike. Similarly, if a spike in the network load is predicted at a future time, an updated traffic profile can be pre-set to become effective at or before that future time to mitigate the predicted spike. The adaptation of the traffic profile can be determined to achieve one or more targets, such as to maintain a certain network throughput, to maintain a certain utilization rate of network resources, etc.

As another illustrative example, various compression and caching decisions can be determined (e.g., by the appliance) with respect to providing data related to loading and/or displaying a web page. In some cases, a client device (e.g., client device 130A) may take a while to acquire the data of the entirety of a webpage, from a remote web server, for displaying the webpage. This can be the case when the webpage includes a certain number of images with huge data size, and the data is transmitted over one or more networks that span a long distance. Various caching and compression techniques can be used to speed up the webpage data transmission for displaying, such as caching part of the webpage at a cache that is at a vicinity of the client device (e.g., a cache located at network 102 of FIG. 1A), compression of certain images of the webpage based on a display screen size of the client device, etc. In some embodiments, caching and compression techniques can be determined dynamically to adapt to, for example, the current network load, a predicted network load, data that reflects current or predicted pattern of access to a web site (e.g., a specific web page is accessed much more often than the other), etc.

In some embodiments, a use case can include a strategy of determining, in real-time, that a particular network traffic is associated with a malicious attack. A security solution against such an attack can then be determined accordingly. In some embodiments, a certain pattern of network traffic and/or associated network parameters, can be associated with such an attack, and can be memorized (e.g., being stored at a database). The appliance can then compare a current pattern of network traffic (and/or network parameters associated thereof) with the memorized patterns associated with prior attacks, to detect whether an attack is underway or imminent. The memorized patterns can be updated by the appliance to reflect changes in subsequent attacks, to improve the accuracy of future detections.

Figure 3:
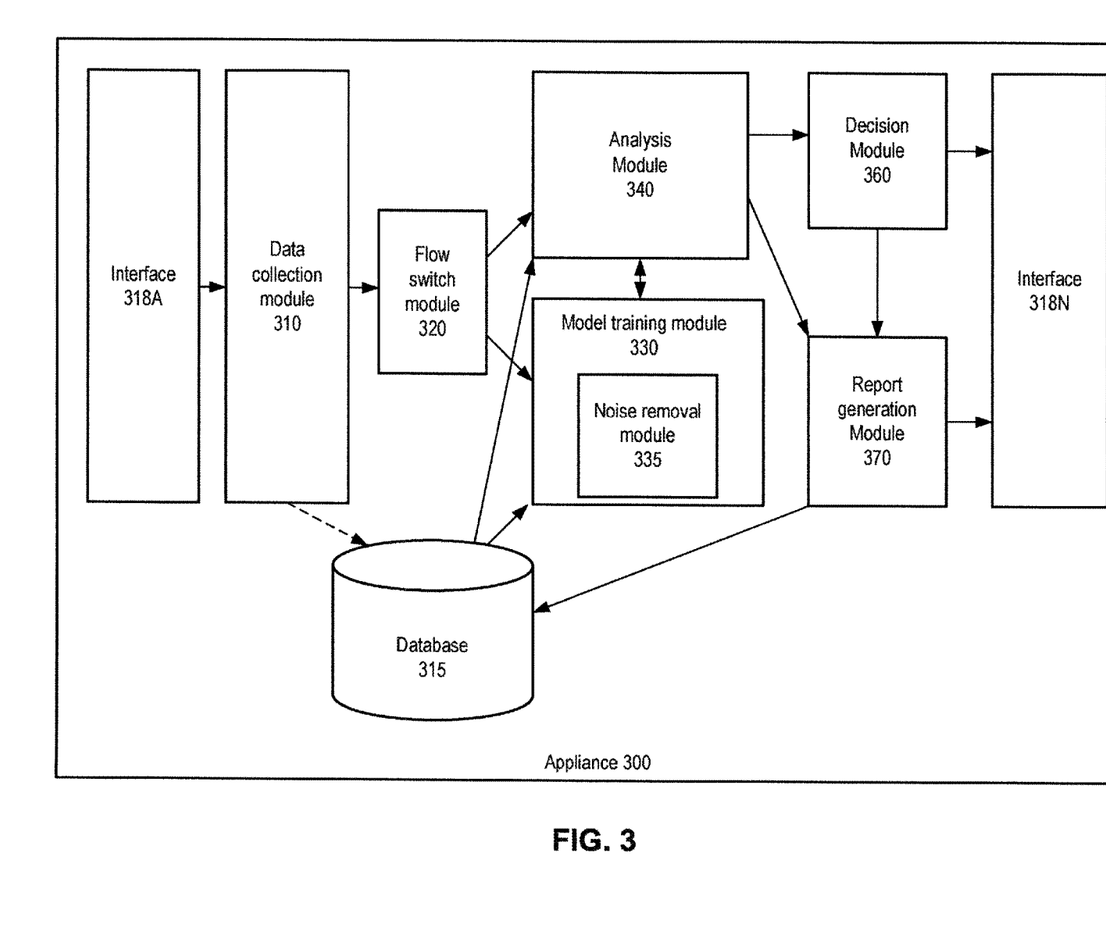
FIG. 3 is a block diagram of an exemplary appliance provided in an exemplary network environment, consistent with embodiments of the present disclosure.

FIG. 3 is a block diagram of an exemplary appliance 300 provided in an exemplary network environment, consistent with embodiments of the present disclosure. Appliance 300 can be any of appliances 140 and 158A-C from FIGS. 1A-B. Appliance 300 can be a module, which is a packaged functional hardware unit designed for use with other components (e.g., portions of an integrated circuit) or a part of a program (stored on a computer readable medium) that performs a particular function of related functions and can be, for example, running standalone, in a clustered mode, or on a big-data infrastructure (e.g., Hadoop™).

In some embodiments, appliance 300 can process outgoing packets and can accept incoming packets from other networks. Appliance 300 can also collect data related to certain network metrics associated with network performance, from one or more network devices. Based on the strategies and purposes of network optimization associated with a use case, appliance 300 can process the packets to extract various data related to certain network metrics associated with the use case. In some cases, appliance 300 can then determine a representation of the extracted data reflecting a recurring pattern in the extracted data. Such a representation can be in the form of a model, which can be configured to predict or to detect one or more network events associated with the use case. In some cases where the representation already exists, appliance 300 can apply the extracted data to the model to detect and/or predict network events. In response to a detected or predicted network event, appliance 300 can determine a real-time response, which can include, for example, a set of network device configurations that mitigate the effects of the network events to maintain or improve network performance As shown in FIG. 3, appliance 300 can include one or more interfaces 318A-N. In some embodiments, interfaces 318A-N can include hardware interfaces configured to interface with a network (e.g., network interface 218 of FIG. 2A). In some embodiments, interfaces 318A-N can also include software interfaces configured to provide data entry and exit points similar to, for example, an Application Programming Interface (API), which allows appliance 300 to communicate with other software processes. Appliance 300 may also include a data collection module 310, a database 315, a flow switch module 320, a model training module 330, an analysis module 340, a decision module 360, and a report generation module 370. Each of these modules can be threads, single processes running on a single machine, or a set of cooperating threads and processes running on multiple machines. Moreover, although FIG. 3 depicts two interfaces 318A and 318N, it is appreciated that interfaces 318A-318N may include any number of network interfaces. It is also appreciated that at least some of the modules depicted in FIG. 3 may be excluded in some embodiments.

In some embodiments, data collection module 310 is configured to collect and process data packets to extract various data related to certain network metrics associated with a use case. Data collection module 310 can collect the data by intercepting network traffic (e.g., as part of a network probe), or from a network device (e.g., gateway 120 of FIG. 1A) configured to process the network traffic. Based on a use case, different parameters can be extracted or interpreted from the data packets. Optionally, data collection module 310 can also cleanse (e.g., removal of unnecessary information from the data for the purpose of network optimization) and format the data to facilitate the processing by subsequent modules. In some embodiments, data collection module 310 is configured to collect and extract a list of parameters for each of the aforementioned exemplary use cases. As an illustrative example, an inconclusive list of parameters collected by data collection module 310 for each of the aforementioned exemplary use cases is illustrated below in Table 1:

TABLE 1

| Use case | Parameters/Outputs |
| --- | --- |
| Detecting network traffic patterns | Incoming/outgoing bytes and packet counts<br>Time between sequences of data (bytes, requests/responses, etc.)<br>Transport protocol parameters<br>Protocol specific data and metadata |
| Capacity Planning | Memory usage<br>CPU usage<br>Network I/O interface bandwidth<br>Other resources usage (hardware like SSL cards) |
| Predict the future load | Transactions per second<br>Byte counters<br>Connection rates<br>Traffic mix |
| Dynamic licensing, dynamic profiling, dynamic caching and compression of web content | Key sizes<br>Cipher<br>Topology<br>Box hardware<br>Throughput<br>Number of packets per second<br>CPU cores<br>Bucket size<br>SSL limit<br>Layout ID<br>Cavium cores limit |
| Security Solutions | Protocols interleave intervals (e.g. mix of DNS, HTTP, HTTPS, etc.)<br>Protocol specific data and metadata<br>Data chunk sizes<br>Encryption parameters |

In some embodiments, the collected and extracted data can be stored at database 315. The data can be organized based on the associated use case and/or a type of analysis to be performed. The data can also be timestamped. In some embodiments, appliance 300 can use the data to create or update one or more models that are configured to facilitate an analysis on the network metrics data. Data related to the models can also be stored in database 315, and can also be associated with a use case. Appliance 300 can then later retrieve the model from database 315 based on a use case and/or the type of analysis to be performed, and apply real-time network metrics data to the model to perform an analysis. Based on an interpretation of the result of the analysis, appliance 300 can predict and/or detect a network event.

After collecting and extracting the data, data collection module 310 can forward the data to flow switch module 320. In some embodiments, flow switch module 320 can determine whether the data is to be used to create and/or update model, or whether the data is to be applied to the model for predicting and/or detecting network events. The determination can be based on various factors. As an illustrative example, flow switch module 320 can determine that the data is to be used for creation of the model, after determining that a model does not exist for a use case and/or for a particular analysis. Flow switch module 320 can then determine that the data is to be provided to model training module 330 to create the model. On the other hand, if flow switch module 320 determines that a model exists, flow switch module 320 can determine to provide the data to analysis module 340 to perform an analysis.

In some embodiments, model training module 330 is configured to create one or more models to facilitate different types of analyses associated with different types of use cases. In some embodiments, the models can be generated to include one or more formulae. Such formulae can be used to, for example, calculate a numerical value that represents a prediction of future metrics (e.g., network metrics, hardware capacity metrics, etc.) based on real-time network metrics data collected by data collection module 310. Such formulae can be generated based on a statistical analysis on recurring patterns of network traffic as reflected from prior network metrics data collected by data collection module 310. The recurring patterns can be detected within a certain period of time, within a certain geographical region, or based on any other criteria. In some embodiments, the formula can be in the form of a linear regression. The formula can be generated based on any combinations of the parameters listed in Table 1 for each of the use cases.

In some embodiments, the models can include a set of rules and classifications. The classifications can be configured to, for example, classify certain data packets being transmitted in the network to be associated with media data, and/or with a certain type of media content (e.g., video or audio), and/or with a certain license, etc. The rules can also be configured to, for example, detect that certain network traffic is associated with a malicious data. In some embodiments, the set of classifications and rules can be generated by one or more types of machine learning analysis, such as neural networks, support vector machines, decision trees, etc., based on the prior network metrics data collected by data collection module 310. The sets of classifications and rules can be generated based on any combinations of the parameters listed in Table 1 for each of the use cases. In some embodiments, the set of rules can also be used for anomaly detection (e.g., to detect a spike in network traffic that does not conform to expectation, based on a use case and/or time).

In some embodiments, the models can also reflect a result of clustering. The clustering can be based on various criteria. For example, in some embodiments a cluster may include network traffic originating from the same user, or from users within a certain geographical region. In some embodiments, a cluster may include network traffic associated with a particular category of application, and/or associated with certain period of time. In some embodiments, a cluster may also include network traffic associated with a particular content (e.g., sports, news, etc.) and/or associated with certain type of users (e.g., home, corporate, etc.). A cluster can also be any combination of the aforementioned clusters (e.g., network traffic associated with users who live in a specific region, and visit news sites in afternoon hours, or network traffic associated with sites that are designed for users who view sports at night, etc.). A model can then be created to represent a result of the clustering. In some embodiments, the models can be used to analyze network traffic based on a relationship between the attributes of detected traffic and the attributes of a cluster of network traffics represented by the models. The clustering can be generated based on any combinations of the parameters listed in Table 1 for each of the use cases.

The aforementioned models can be created or updated based on real-time network metrics data from flow switch module 320, and/or historical network metrics data acquired from database 315. As discussed before, in a case where flow switch module 320 determines that a model associated with a particular use case (e.g., traffic pattern) and/or with a particular analysis (e.g., future load prediction) is not stored in database 315, model training module 330 can be instructed to create or update the model, in real-time, based on data received from flow switch module 320. The model can then be provided to analysis module 340 for an analysis of subsequent network metrics data. In some embodiments, model training module 330 can also update the models periodically with the current network metrics data, to further improve the accuracy of the model. In some embodiments, as to be discussed below, model training module 330 can also update a model based on an output of analysis with that model from analysis module 340.

A list of example models created by model training module 330 for various use cases is illustrated below in Table 2:

TABLE 2

|  | Traffic patterns | Dynamic licensing | Capacity planning | Security | Predict future load |
|---|---|---|---|---|---|
| Linear Regression | | Predict the future network traffic volume | Predict the future network traffic volume | Predicting the amount of future traffic to manage | Identify attack trends | Predict the future load |
| Classification (Neural Networks, Support Vector Machines, Decision Trees Clustering | | Detect encrypted traffic patterns, video or other traffic | Detect the future traffic with certain confidence | | Identify Malicious (encrypted) connection | |
| | | Group traffic patterns into clusters based on certain criteria | Group the traffic in terms of clusters | Group resources in terms of usage | Group connection in clusters | |
| Anomaly detection | | Identify spikes in the network traffic | Identify possibly faulty behavior | Identify suspicious behavior | Identify spikes in the network traffic | |

Optionally, model training module 330 can also include noise removal module 335. In some embodiments, noise removal module 335 is configured to remove portions of data that exhibit vastly different behavior from the rest of the data. Such data can be identified as noise data, and can be discarded from the model creation and/or update. Without removing such noise data, the accuracy of prediction and/or detection of the created model can be deteriorated by such noise data, which can lead to unwanted behavior when it comes to making decisions. In some embodiments, noise data can be detected by applying data that are related in a certain way (e.g., data that are collected during the same time-frame and/or from the same geographical region) to the model to generate a result. The result can then be compared with other results obtained by applying the same model to other data. Noise data can then be detected when the results exhibit certain non-uniformities. Model training module 330 can then discard the noise data from the creation and/or updating of the model.

In some embodiments, analysis module 340 is configured to apply real-time network metric data, received from flow switch module 320, to a model generated by model training module 330. In a case where the model was generated and stored at database 315, analysis module 340 can retrieve the model from the database 315 based on one or more criteria. The criteria can include, for example, a use case (e.g., traffic pattern), and/or a type of analysis (e.g., future load prediction) to be performed, etc., such that the network metric data to be provided to the model is of the same type as the data used to create or to update the model. In a case where none of the models stored at database 315 matches the criteria, analysis module 340 can receive a model dynamically generated by model training module 330. Analysis module 340 can then apply the real-time network metrics data to the model to perform an analysis.

In some embodiments, based on the type of analysis performed, the output of the analysis can include, for example, a numerical value that represents a prediction (e.g., a prediction of network load), a classification (e.g., a type of content associated with the data packets being transmitted), and/or a logic output (e.g., whether a network traffic belongs to a pre-defined cluster of network traffics, whether the data packets are associated with a malicious attack, etc.). Analysis module 340 can then provide an output of analysis to, for example, decision module 360.

In some embodiments, analysis module 340 can also provide the output of analysis back to model training module 330, which can also use output of analysis to update the model. As an illustrative example, for some analyses (e.g. support vector machines, linear regression, etc.), information related to probability estimates or confidence intervals can also be generated as a result of the analyses. Model training module 330 can then update the model based on the probability estimates and confidence intervals information to reinforce or weaken a predicted value included in an output of the analysis. As another example, in the use case of anomaly detection where the output is consistently the same (e.g., an output of "true") but the probability estimates decrease over time, that might imply a trend that will soon reverse the output (e.g., an output of "false"). Model training module 330 can then update the model to reflect the trend.

In some embodiments, decision module 360 is configured to determine one or more actions for a network device based on an output of analysis module 340. In some embodiments, the actions can include modifying a content of the data packets. As an illustrative example, based on a result of classification, decision module 360 can determine that a set of data packets are associated with advertisement, and that data associated with the advertisement is not to be transmitted to a client device. Accordingly, decision module 360 can modify the IP header associated with the data packets to, for example, route the data packets to other network devices instead of the client device. Similarly, based on a result of anomaly detection or a classification, decision module 360 can determine that a set of data packets are associated with a malicious attack targeted at a network device (e.g., to overload a particular web server for a denial-of-service attack). In response, decision module 360 can modify the IP header associated with the data packets to route the traffic away from the targeted network device, to instruct other network devices (e.g., gateway, router, etc.) to discard the data packets with the modified IP header, or to implement any kind of policy in the transmission and/or processing of such data packets.

In some embodiments, the actions can include steering data packets among multiple nodes. As an illustrative example, referring back to FIG. 1A, based on a predicted future loading at serving nodes 105, decision module 360 can determine to route some of the data packets at that future point in time to serving node 105A, and route some of the data packets to serving node 105B, to balance the loading of the serving nodes and mitigate the expected effects of overloading a single serving node. In some embodiments, the actions can also include updating a configuration, such as a license or a profile associated with a user, based on predicted network load, with the expectation that the updating of the license or profile can optimize the network traffic by, for example, reducing the network load.

In some embodiments, the output of decision module 360 can also be transmitted to a software network element (e.g., NetScaler) that can determine the actions, based on the output of decision module 360, to be implemented by the network devices. The output of decision module 360 can be provided to interface 318N, which can then transmit the output to the targeted network devices or software network elements.

In some embodiments, report generation module 370 is configured to generate an output, such as an analytics report. The output can be generated based on an output of analysis of analysis module 340, an output of decision module, or a combination of both. The output can be provided as part of a web service, and can also be transmitted by interface 318N to another device (e.g., a client device) or to another processes for, for example, displaying, and/or for further analysis. Moreover, the data of the output (e.g., analytics report) can also be stored at database 315 as part of the historical data and provided to model training module 330 or analysis module 340. For example, in lieu of performing an analysis using the models provided by model training module 330, analysis module 340 can acquire historical analysis results from database 315 based on, for example, a use case (e.g., traffic pattern), and/or a type of analysis (e.g., future load prediction) to be performed, the expected output of the analysis to be provided to decision module 360 (e.g., whether the analysis is to provide a prediction, a classification, a logic output, etc.). As another example, in lieu of receiving output of analysis module 340 to update the model, model training module 330 can also acquire historical analysis results from database 315 and update its model accordingly.

The embodiment and modules or components disclosed in FIG. 3, as well as tables 1 and 2, are exemplary. It is appreciated that many of the components could be combined or separated and placed in different configurations. The structure of FIG. 3 and the content of tables 1 and 2 are not meant to be limiting.

Figure 4:
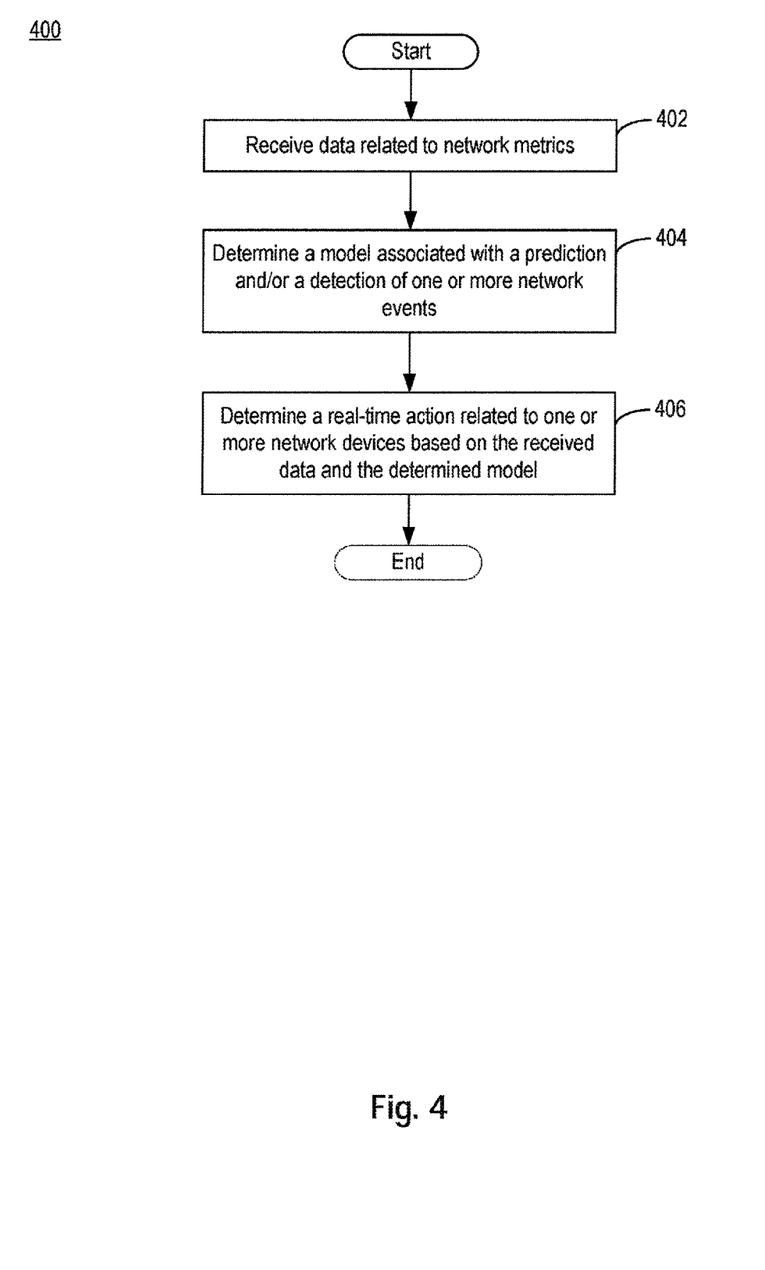
FIG. 4 is a flowchart representing an exemplary method of determining a real-time action related to one or more network devices, consistent with embodiments of the present disclosure.

FIG. 4 is a flowchart representing an exemplary method 400 of determining a real-time action related to one or more network devices, consistent with embodiments of the present disclosure. It will be readily appreciated that the illustrated procedure can be altered to exclude one or more steps, or include one or more additional steps. In some embodiments, method 400 can be implemented by some or all of the components of appliance 300 of FIG. 3.

In step 402, appliance 300 can receive data related to network metrics. The data can include parameters associated with each of the use cases listed in Table 1. The data can be collected either by intercepting a network traffic (e.g., by a network probe) or at a network device that processes the network traffic (e.g., at a router). In some embodiments, the data can also be cleansed and formatted for subsequent processing. In some embodiments, step 402 can be implemented by, for example, data collection module 310.

In step 404, appliance 300 can determine, based on a use case associated with the collected network metrics data, a model associated with a prediction and/or a detection of one or more network events. These network events can include, for example, changes in a network load, changes in demand for network resources, a malicious attack being underway, etc. The model can include any of the models listed in Table 2. The determination of the model can include creation, updating, and retrieval of the model. The model can be created based on an analysis of historical network metrics data and can be retrieved from a database. In a case where a model associated with a particular use case or with a particular analysis is not stored, the model can be created, in real-time, based on any combinations of historical and real-time network metrics data. The model can also be updated based on a result of application of the model to the real-time network metrics data. In some embodiments, step 404 can be implemented by, for example, flow switch module 320, model training module 330, or a combination thereof. Optionally, noise data can be identified and removed by, for example, noise removal module 335, from the data to be used for the creation and/or updating of the model.

In step 406, appliance 300 can determine a real-time action related to one or more network devices based on the data received in step 402 and the model determined in step 404. The determination can include applying the data to the model to perform an analysis. An output of the analysis can include, for example, a numerical value that represents a predicted value (e.g., a prediction of future network traffic load), a classification (e.g., classifying content of data packet to be related to video), a logic output (e.g., whether a network traffic is related to a malicious attack), etc. The determination can also include, based on a result of the analysis, a real-time action related to one or more network devices. The real-time action can include, for example, load-balancing decision, modification of content of data packets to reroute the data packets, generation of analytics report, etc. In some embodiments, step 406 can be implemented by, for example, any combinations of analysis module 340, decision module 360 and report generation module 370. The decision can then be transmitted to a network device (e.g., a gateway, a data center, etc.) or to software network element (e.g., NetScaler) via, for example, interface 318N.

Figure 5:
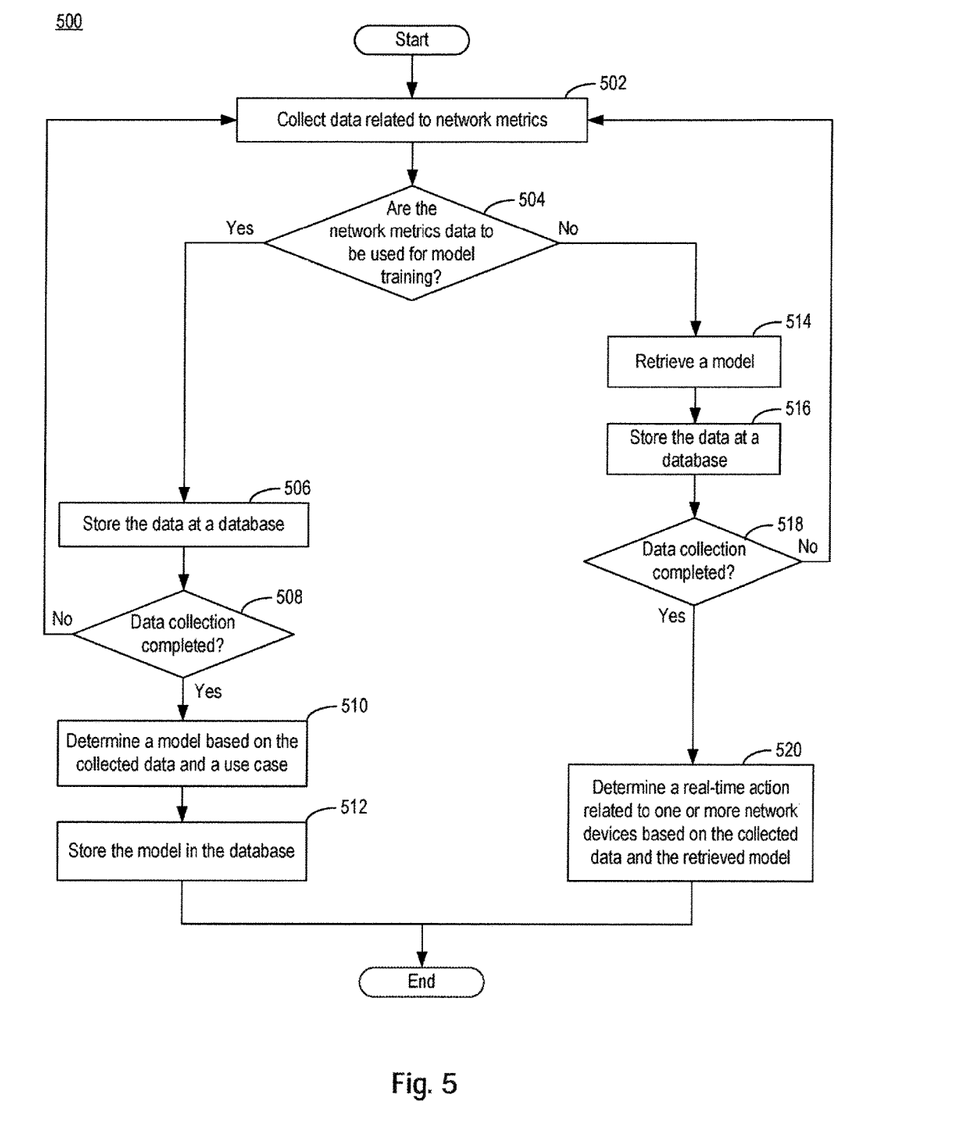
FIG. 5 is a flowchart representing an exemplary method of determining a real-time action related to one or more network devices based on historical network performance data, consistent with embodiments of the present disclosure.

FIG. 5 is a flowchart representing an exemplary method 500 of determining a real-time action related to one or more network devices, consistent with embodiments of the present disclosure. It will be readily appreciated that the illustrated procedure can be altered to delete steps or further include additional steps. In some embodiments, method 500 can be implemented by some or all of the components of appliance 300 of FIG. 3.

In step 502, appliance 300 can collect data related to network metrics. The data can include parameters for each of the use cases listed in Table 1. The data can be collected either by intercepting a network traffic (e.g., by a network probe) or at a network device that processes the network traffic (e.g., at a router). In some embodiments, a predetermined set of network metrics can be collected, wherein the set is determined based on the use case and on a requirement of the analysis to be performed. In some embodiments, step 502 can be implemented by, for example, data collection module 310 of FIG. 3.

In step 504, appliance 300 determines whether the network metrics data collected in step 502 are to be used for model training (e.g., to create or to update a model configured to facilitate an analysis). The determination can be based on various factors, such as whether a model has been previously created for a use case and/or for a particular analysis (e.g., as listed in Table 2), whether the model should be updated (based on a result of the analysis, the expiration of a timer that indicates the model is to be updated, or other criteria), or according to any other configurations, etc. In some embodiments, step 504 can be implemented by, for example, flow switch module 320 of FIG. 3.

If the network metrics data collected are determined to be used for model training ("Yes" in step 504), appliance 300 can proceed to store the data in a database (e.g., database 315 of FIG. 3), in step 506. Appliance 300 can then determine whether data collection is completed, in step 508. Based on a use case and/or a type of analysis to be performed, there can be a requirement for a minimum sample size of data to be collected, for the creation or updating of the model. Appliance 300 can determine whether data collection is completed based on whether a requisite sample size of data has been collected in step 508. If appliance 300 determines that data collection is not completed ("No" in step 508), process 500 can return to step 502 to collect more data.

On the other hand, if appliance 300 determines that data collection has been completed ("Yes" in step 508), process 500 can proceed to step 510, to determine a model based on the collected data and a use case. The model can be associated with a prediction and/or a detection of one or more network events. The model can also include any of the models listed in Table 2. The determination of the model can include creation, updating, and retrieval of the model. The model can also be created based on an analysis of any combinations of historical network metrics data and the real-time network metrics data collected in step 502. The model can also be updated based on a result of application of the model to the real-time network metrics data. In some embodiments, steps 506, 508, and 510 can be implemented by, for example, any combinations of flow switch module 320 and model training module 330 of FIG. 3. Optionally, noise data can be identified and removed by, for example, noise removal module 335, from the data to be used for the creation and/or updating of the model. The determined model can then be stored in a database (e.g., database 315) for later retrieval, in step 512. Data related to the model can be associated with a use case and/or with a type of analysis in the database.

Referring back to step 504, if it is determined that the network metrics are not to be used for model training ("No" in step 504), appliance 300 can then proceed to step 514 to retrieve a model. The model can be retrieved from a database (e.g., database 315) based on a use case and/or a type of analysis to be performed, as listed in Table 2. In a case where the requested model is not stored in the database, appliance 300 (e.g. model training module 330) can also create, in real-time, a model for the use case and/or the type of analysis, and provide the model.

After retrieving the model in step 514, appliance 300 can then proceed to store the collected network metrics data at a database (e.g., database 315), in step 516. Appliance 300 can then determine where data collection has been completed, in step 518. As an illustrative example, an analysis using a certain model can require a certain sample size of data. For example, a linear regression formula may include a certain number of arguments, which can then determine the number of inputs to be provided, thereby requiring a certain sample data size. If appliance 300 determines that data collection has not been completed ("No" in step 518), it can proceed back to step 502 to continue with the data collection.

On the other hand, if appliance 300 determines that data collection has been completed ("Yes" in step 518), it can proceed to step 520, to determine a real-time action related to one or more network devices based on the collected data and the retrieved model. The determination can include applying the data to the model to perform an analysis. An output of the analysis can include, for example, a numerical value that represents a predicted value (e.g., a prediction of future network traffic load), a classification (e.g., classifying content of data packet to be related to video), a logic output (e.g., whether a network traffic is related to a malicious attack), etc. The determination can also include, based on a result of the analysis, a real-time action related to one or more network devices. The real-time action can include, for example, load-balancing, modification of content of data packets to reroute the data packets, generation of analytics report, etc. In some embodiments, steps 514, 516, 518 and 520 can be implemented by, for example, any combinations of analysis module 340, decision module 360, and report generation module 370. The decision can then be transmitted to a network device (e.g., a gateway, a data center, etc.) or to software network element (e.g., NetScaler) via, for example, interface 318N of FIG. 3.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

That which is claimed:

1. A method for optimizing network performance, comprising:
   receiving data related to one or more network metrics;
   determining whether the received data is to be used for creating a new model or updating an existing model that represents a recurring pattern in the received data to be used to predict or detect one or more network events;
   if the received data is not to be used for creating the new model or updating the existing model, then apply the data to the existing model;
   determining a configuration related to one or more network devices based on the received data being applied to the determined model; and
   configuring the one or more network devices according to the determined configuration.

2. The method of claim 1, wherein if the received data is to be used for creating the new model or updating the existing model, then create or update the model, with the created or updated model to be used with subsequently received data.

3. The method of claim 1, wherein the received data corresponds with a use case, with each use case including different strategies and purposes for optimizing network performance.

4. The method of claim 3, wherein the received data is used to determine a use case that comprises detecting network traffic associated with a predetermined protocol and with a predetermined physical layer based on at least one of: protocol properties, traffic patterns, and packet-rate specific metrics.

5. The method of claim 3, wherein the received data is used to determine a use case that comprises: supporting dynamically allocating network resources; wherein the configuration is determined based on the current network traffic and predicted demand indicated by the model.

6. The method of claim 3, wherein the received data is used to determine a use case that comprises: adapting a traffic profile for network traffic; wherein the configuration is determined based on a predicted network load indicated by the model and comprises at least one of: a maximum segment size (MSS) for data packets, a value of maximum burst size of the network traffic, and a buffer size of a queue for the data packets.

7. The method of claim 3, wherein the received data is used to determine a use case that comprises: determining at least one of a caching or a compression policy for webpage data; wherein the configuration is determined based on at least one of: current network load, predicted network load indicated by the model, and predicted pattern of access to a website indicated by the model.

8. The method of claim 3, wherein the received data is used to determine a use case that comprises: detecting a malicious attack over a network; wherein the configuration is determined based on comparing a current pattern of network traffic against a historic pattern of the network traffic indicated by the model and comprises rerouting data packets away from a target device.

9. The method of claim 1, wherein the model comprises a clustering model of network traffic patterns associated with the network traffic, the clustering model being generated based on at least one of: sources of the network traffic, applications associated with the network traffic, time periods associated with the network traffic, types of contents associated with the network traffic, and types of users associated with the network traffic.

10. An apparatus for optimizing network performance, comprising:
   a memory that stores a set of instructions; and
   a hardware processor configured to execute the set of instructions to perform:
   receiving data related to one or more network metrics;
   determining whether the received data is to be used for creating a new model or updating an existing model that represents a recurring pattern in the received data to be used to predict or detect one or more network events;
   if the received data is not to be used for creating the new model or updating the existing model, then apply the data to the existing model;
   determining a configuration related to the one or more network devices based on the received data being applied to the determined model; and
   configuring the one or more network devices according to the determined configuration.

11. The apparatus of claim 10, wherein if the received data is to be used for creating the new model or updating the existing model, then the set of instructions further comprise creating or updating the model, with the created or updated model to be used with subsequently received data.

12. The apparatus of claim 10, wherein the received data corresponds with a use case, with each use case including different strategies and purposes for optimizing network performance.

13. The apparatus of claim 12, wherein the received data is used to determine a use case that comprises: detecting network traffics associated with a predetermined protocol and with a predetermined physical layer based on at least one of: protocol properties, traffic patterns, and packet-rate specific metrics.

14. The apparatus of claim 12, wherein the received data is used to determine a use case that comprises: supporting dynamically allocating network resources; wherein the configuration is determined based on the current network traffic and predicted demand indicated by the model.

15. The apparatus of claim 12, wherein the received data is used to determine a use case that comprises: adapting a traffic profile for network traffic; wherein the configuration is determined based on a predicted network load indicated by the model and comprises at least one of: a maximum segment size (MSS) for data packets, a value of maximum burst size of the network traffic, and a buffer size of a queue for the data packets.

16. The apparatus of claim 12, wherein the received data is used to determine a use case that comprises: determining at least one of a caching or a compression policy for webpage data; wherein the configuration is determined based on at least one of: current network load, predicted network load indicated by the model, and predicted pattern of access to a website indicated by the model.

17. The apparatus of claim 12, wherein the received data is used to determine a use case that comprises: detecting a malicious attack over a network; wherein the configuration is determined based on comparing a current pattern of network traffic against a historic pattern of the network traffic indicated by the model and comprises rerouting data packets away from a target device.

18. The apparatus of claim 10, wherein the model comprises a clustering model of network traffic patterns associated with the network traffic, the clustering model being generated based on at least one of: sources of the network traffic, applications associated with the network traffic, time periods associated with the network traffic, types of contents associated with the network traffic, and types of users associated with the network traffic.

19. A non-transitory computer readable medium that stores a set of instructions that is executable by at least one processor of an apparatus to cause the apparatus to perform a method for optimizing network performance, the method comprising:
   receiving data related to one or more network metrics;
   determining whether the received data is to be used for creating a new model or updating an existing model that represents a recurring pattern in the received data to be used to predict or detect one or more network events;
   if the received data is not to be used for creating the new model or updating the existing model, then apply the data to the existing model;
   determining a configuration related to the one or more network devices based on the received data being applied to the determined model; and
   configuring the one or more network devices according to the determined configuration.

20. The non-transitory computer readable medium of claim 19, wherein if the received data is to be used for creating the new model or updating the existing model, then the method further comprises creating or updating the model, with the created or updated model to be used with subsequently received data.

\* \* \* \* \*